US009697042B2

(12) United States Patent
Stein et al.

(10) Patent No.: US 9,697,042 B2
(45) Date of Patent: *Jul. 4, 2017

(54) EXTENSIBILITY OF BUSINESS PROCESS AND APPLICATION LOGIC

(75) Inventors: Tobias Stein, Heidelberg (DE); Klaus Nottbohm, Hockenheim (DE); Frank Mock, Diedorf (DE); Stefan Kusterer, Malsch (DE); Ralf Dentzer, Hockenheim (DE); Karsten Bohlmann, Rauenberg (DE)

(73) Assignee: SAP SE, Walldorf (DE)

(*) Notice: Subject to any disclaimer, the term of this patent is extended or adjusted under 35 U.S.C. 154(b) by 523 days.

This patent is subject to a terminal disclaimer.

(21) Appl. No.: 12/847,142

(22) Filed: Jul. 30, 2010

(65) Prior Publication Data

US 2012/0030223 A1 Feb. 2, 2012

(51) Int. Cl.
*G06F 7/00* (2006.01)
*G06F 9/48* (2006.01)
*G06F 9/52* (2006.01)
*G06F 17/30* (2006.01)

(52) U.S. Cl.
CPC .............. *G06F 9/4843* (2013.01); *G06F 9/52* (2013.01); *G06F 17/30368* (2013.01)

(58) Field of Classification Search
CPC ................................................ G06F 17/30368
USPC .......................................................... 707/608
See application file for complete search history.

(56) References Cited

U.S. PATENT DOCUMENTS

| 5,241,668 | A  | * | 8/1993  | Eastridge ............ G06F 11/1461 707/999.202 |
| 5,241,688 | A  | * | 8/1993  | Arora ............................. 455/502 |
| 5,768,515 | A  | * | 6/1998  | Choquier ................ H04L 29/06 370/389 |
| 6,874,130 | B1 | * | 3/2005  | Baweja ............. G06F 17/30067 707/E17.01 |
| 7,636,742 | B1 | * | 12/2009 | Olavarrieta et al. |
| 7,684,964 | B2 | * | 3/2010  | Outhred ................ G06F 9/4433 703/13 |
| 8,418,181 | B1 | * | 4/2013  | Sirota .................... G06F 9/5033 709/201 |
| 8,510,264 | B1 | * | 8/2013  | Tamm ....................... G06F 7/00 707/608 |
| 2002/0099681 | A1 |   | 7/2002  | Gainey et al. |
| 2002/0198880 | A1 | * | 12/2002 | Ullmann ............ G06F 17/30348 |
| 2003/0154115 | A1 | * | 8/2003  | Lahey .................... G06Q 10/10 718/106 |
| 2004/0098394 | A1 | * | 5/2004  | Merritt ............. G06F 17/30067 |
| 2005/0125719 | A1 | * | 6/2005  | Daniel ................ G06F 17/3089 715/234 |
| 2005/0210020 | A1 | * | 9/2005  | Gunn .................... G06F 3/0237 |

(Continued)

*Primary Examiner* — Eliyah S Harper
(74) *Attorney, Agent, or Firm* — Jones Day

(57) ABSTRACT

A core system including different program components performing distinct tasks in a workflow sequence that are initiated through status field updates of objects in database may be modified to define a new status triggering additional processes in an action management system. Once the additional processes are completed, the status field may be changed to an original status provided by the core system to trigger a second program component in the workflow sequence. The action management system may contain user customized processes that may be modified and changed independent of the functionality provided by the core system.

16 Claims, 8 Drawing Sheets

(56) References Cited

U.S. PATENT DOCUMENTS

| | | |
|---|---|---|
| 2005/0235000 A1 | 10/2005 | Keil |
| 2008/0027952 A1* | 1/2008 | Gelb ................. G06F 17/30398 |
| 2008/0208887 A1* | 8/2008 | Balachandran ........... G06F 8/00 |
| 2009/0024638 A1* | 1/2009 | Bangel .............. G06F 17/30345 |
| 2009/0235182 A1* | 9/2009 | Kagawa ............ G06F 17/30873 715/753 |
| 2010/0153696 A1* | 6/2010 | Beachem .............. G06F 9/4406 713/2 |
| 2010/0306011 A1* | 12/2010 | Correll ................... G06Q 10/06 705/7.36 |

* cited by examiner

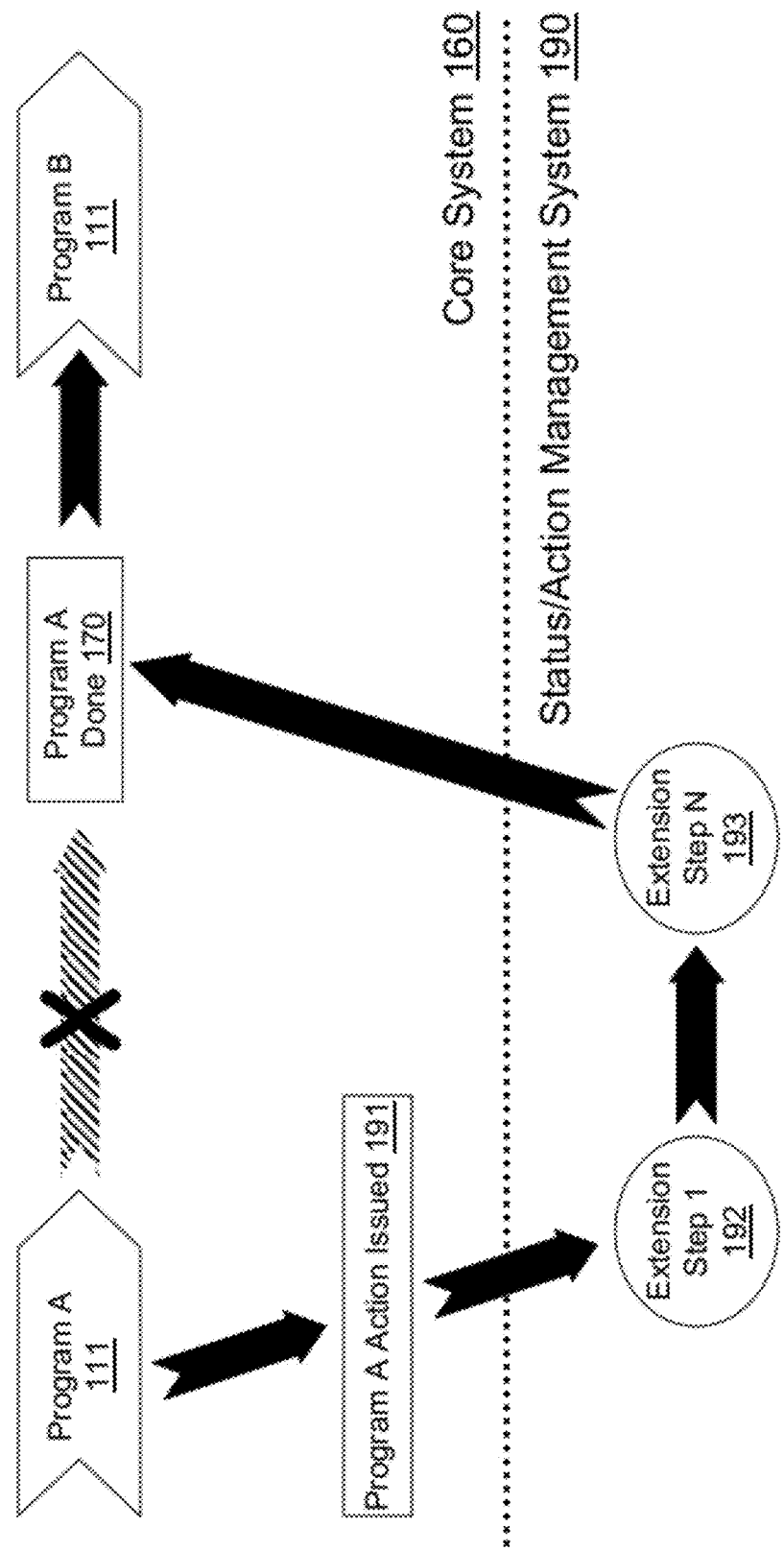

EXTENSIBILITY OF BUSINESS PROCESS AND APPLICATION LOGIC

BACKGROUND

Organizations use enterprise resource planning (ERP), customer relationship management (CRM), and other business management systems to manage business processes and workflows. These systems may include various subcomponents to manage different tasks in a workflow. For example, an order management system may generate an order form, supply the form to a prospective purchaser, and process the completed form submitted by the purchaser. A delivery management system may instruct an entity to initiate delivery of the ordered items in the completed order form and track the status of the order items throughout the delivery process.

Each of these subcomponents may be wholly independent from each other, in that the subcomponents may not directly communicate with each other. Thus, in the above example, the order management system may not directly communicate with the delivery management system. Although these subcomponents may not directly communicate, a business workflow may still require tasks and functions to be completed in a specific order. For example, an order form may have to be completed and processed before goods may be delivered.

To preserve order and continuity in the workflow, each of the subcomponents may update a status field of a object in a database. Once a subcomponent has completed its assigned tasks on an object, the subcomponent may update the status field for the object in the database accordingly. A second subcomponent in the workflow may be configured to check the status field of objects in the database and begin processing objects with a status field indicating that the prior subcomponent in the workflow has been completed. This ensures that the second subcomponent is not processed out of sequence.

FIG. 1a is shows an existing process management workflow 100. In this workflow, a first program A 110 may be designed to perform a sequence of tasks, such as initiating a first task 101 in response to a stimulus, performing the first task 102 on an object, and then updating the status in a status field 141 of the object. The status field 141 of the object may be updated to indicate whether the first task was successfully completed 170.

Program A 110 may be independent of the second program, program B 180, which may be designed to perform a sequence of other tasks, such as checking the status field 141 of objects, and initiating and completing a second task 105 when the status field 141 indicates that program A 110 was successfully completed. This may ensure that program B 180 is not completed before program A 110 and that the processing order of tasks in the workflow is maintained even though the programs A 110 and B 180 do not directly communicate.

Many existing business process management systems include the functionality shown in FIG. 1a. However, some users of these existing systems may have additional workflow processes that they would like to perform that are not included in the generic system. For example, users in some countries may have additional locality-specific compliance checks that need to be performed between different tasks and programs in the system. Other users may have specific processes unique to their organization that they would like to perform.

Users wanting to include additional user-specific processes have had to modify the existing systems to include the additional functionality. However, these user-specific modifications have also caused complications when upgrading business management systems or when integrating other systems with the business management systems. Complications may occur because the upgrading and/or integration process may either overwrite the user-specific modifications or may result in an incompatibility between the functionality offered in the new systems with the modifications previously made to the existing system.

Thus, there is a need for processes and systems that enable user-specific process modifications of existing process management systems that are independent of system upgrades and integrations.

BRIEF DESCRIPTION OF THE DRAWINGS

FIG. 1b shows an exemplary embodiment of the invention.

DETAILED DESCRIPTION

A core system may include different program components to perform tasks in a workflow sequence according to a status of an object recorded in a database status field. In an embodiment of the invention, the recorded status of a task may be modified from a completed status to a partially completed status when the task in the core system is successfully completed. An action management system may be used to perform additional processes and tasks on objects with the partial completion status. Once the additional processes and tasks are completed, the recorded status may be further modified to the original completed status so that other program components in the core system depending on the original completed status may continue to operate.

Figure 1A:
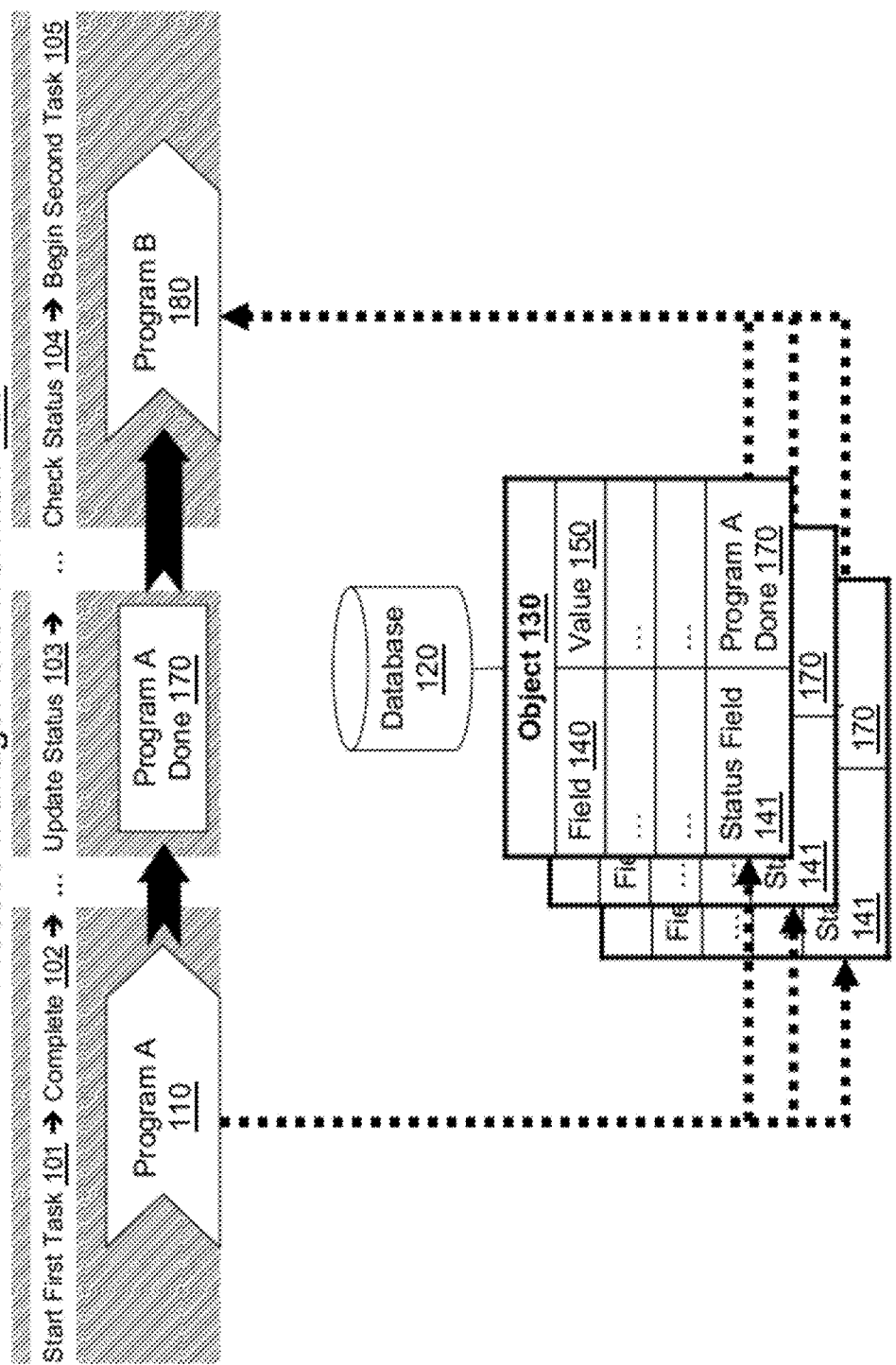
FIG. 1a is shows an existing process management workflow.

FIG. 1b shows an exemplary embodiment of the invention. In this embodiment, a core system 160 may include different program components 111, such as programs A and B that perform different tasks in a workflow. Each of the programs A and B 111 may be independent of each other in that the programs A and B do not directly communicate. To ensure that tasks are processed sequentially according to a predetermined workflow, a status field 170 of an object may be updated when each program is successfully completed on the object. Instead of updating the status field 170 to record the successful completion of program A 111 on an object with the exemplary status "Program A Done", the core system may modified to record the successful completion of Program A 111 on the object with a partial completion status, such as "Program A Action Issued" 191. In some instances, this may be the only modification to the core system 160 necessary to use the claimed invention. By minimizing the modifications to the core system 160, modifications, upgrades, and additions to the core system 160 may be more readily and efficiently integrated.

A separate status/action management system 190 may also be included in an embodiment. The action management system 190 may include functionality to check on the status of object and perform additional processing on objects depending on the current status of the object. For example, the action management system 190 may use push or pull technologies, such as HTTP server pushes, Java® pushlets, and RSS feeds, to check for status field updates.

Objects with different statuses may cause different processes to be performed. For example, once the action management system 190 becomes aware that an objects has the modified program A completion status "Program A Action Issued" 190, the action management system 190 may initiate a series of additional processes, shown as extension steps 1 to N 192. Once these additional extensions steps 1 to N 192 have been successfully completed, the action management system 190 may change the status field of the object back to the original completion status "Program A Done" 170 so that the next program B 111 in the workflow, which may only initiate for objects with the original completion status "Program A Done" 170, may begin. Although the status field may be updated with a variety of status indicators, using the original status indicator triggering the next program in the core system 160 workflow eliminates the need to reconfigure the next program in the workflow to respond to a revised status indicator.

Figure 2:
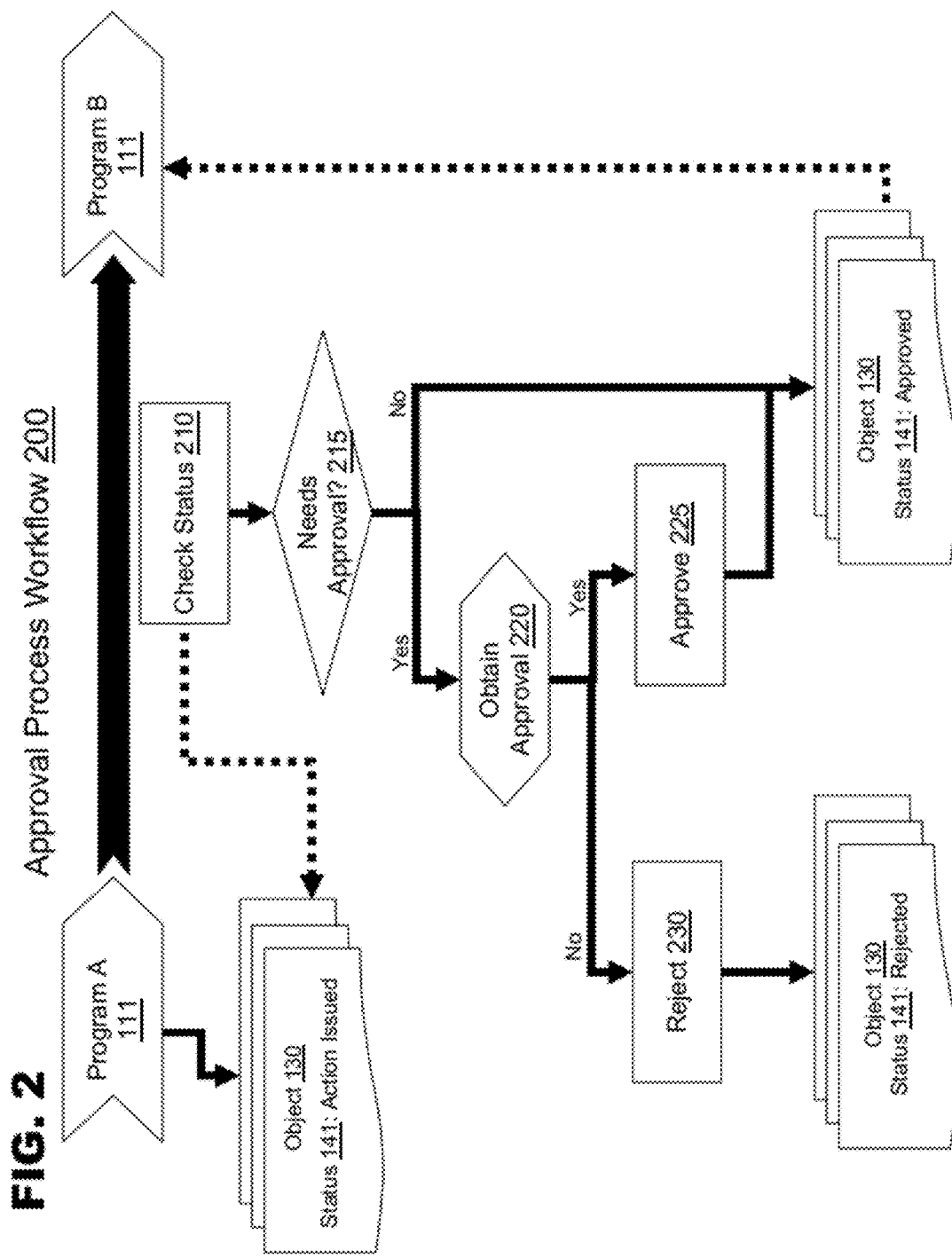
FIG. 2 shows exemplary approval process workflow in an embodiment.

In some embodiments, the action management system may include an approval process to determine when an object's status should reflect full completion of a program to enable a subsequence program in a workflow to commence. FIG. 2 shows exemplary approval process workflow in an embodiment. In this embodiment, when program A 111 in the core system 160 has finished performing its processes on object 130, it may send a partial completion "Action Issued" status to be stored in status field 141 of object 130 in a database.

In box 210, an action management system 190 may synchronously or asynchronously check for updated status field in the database or receive updated status field information from the database.

After checking the status fields in the database for objects with a partial completion status, in box 215 the system may determine whether the object needs further approval before the next program may commence. This determination may be through a programming logic specifying conditions requiring further approval, such as a request for expenditures over $X require approval. Other forms of programming logic, such as, a lookup table may be used to match objects, programs, and/or other approval criteria to determine whether additional approval is needed.

If no further approval is necessary, the status field 141 of the object 130 in the database may be updated to indicate that the object has been approved and/or approval is not necessary for the next program, program B 111, in the sequence to commence.

If, however, additional approval is necessary, in box 220, the system may follow a set of preprogrammed process steps to obtain the necessary approval. For example, if the approval process requires obtaining a permit, license, or other form of regulatory or supervisory approval, the system may electronically: extract the data required to obtain the approval from the organization's computing systems and/or databases, structure the data in a format recognized by the third party approver, send the structured data to the third party approver, and process a received decision of the third party approver.

If the processed decision indicates that the request for approval has been rejected, then in box 230, the action management system 190 may instructions to the database to update the status field 141 of the object 130 to rejected. If the processed decision indicates that the request has been approved, then in box 225 the action management system 190 may instruct the database to update the status field 141 of the object 130 to indicate approval. Instead of merely recording approval or rejection, the action management system 190 may also be configured to store additional data received from a third party approver in the database or other organizational computing system. For example, if the third party approver send an approval number, confirmation code, or license number, instead of or in addition to an express approval, the action management system 190 may be configured to extract this information from the response and update the organization's computing systems with the information.

Figure 3:
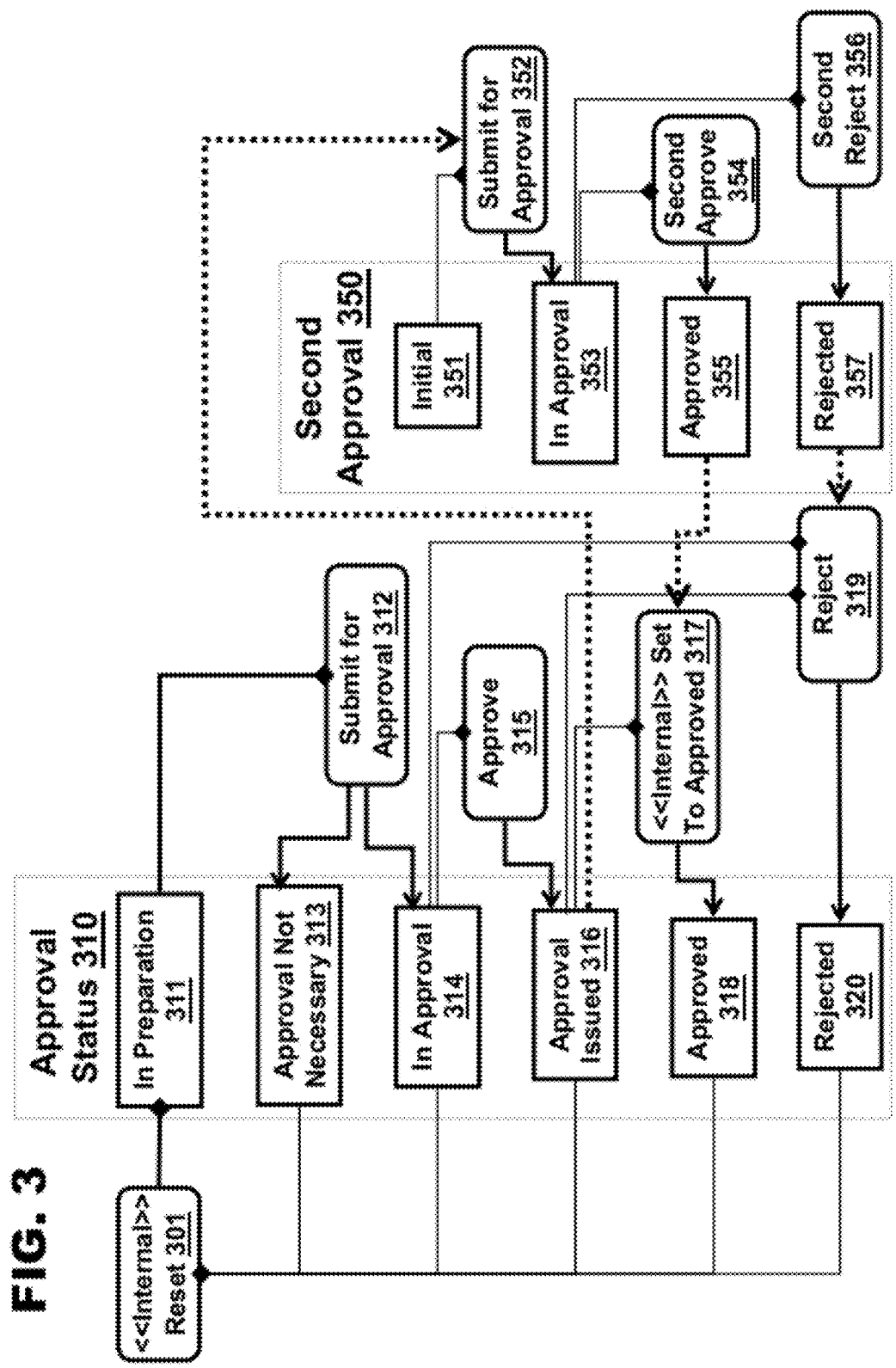
FIG. 3 shows exemplary status changes in a hierarchical approval process workflow.

FIG. 3 shows exemplary status changes in a hierarchical approval process workflow of an embodiment including first and second level approval fields 310 and 350, respectively. In box 301, the approval process system may be reset. The approval status field 310 may be initially set in preparation 311, as preliminary steps of a program are executed. Once steps in the process requiring approval have been reached, an approval request may be submitted for approval.

After submission, the approval request may be electronically processed, and a decision may be made through a lookup table and/or other processing logic whether additional approval is necessary. If no additional approval is necessary, the status field 310 may be updated to indicate Approval Not Necessary 313 and the approval process may terminate. If additional approval is necessary, the approval request may be forwarded to the appropriate approval authority, which may be determined through the aforementioned processing logic. The status field 310 may be updated to indicate that the approval is underway 314.

If the first approval authority approves 315 the request, in box 316 the approval may be recorded in the status field of the object in the database. The aforementioned processing logic may be used to determine whether additional approval is necessary. If additional approval is needed, then in box 352, a request for additional approval may be sent to the designated secondary approval authority. The second approval status field 350 may be changed from an initial value 351 to reflect the in approval 353 status. Once the secondary approver approves the request 354, the status may be updated to approved 355, which may result in the processing logic 317 to update the status of the approval field 310 to approved 318.

If the secondary approver rejects 356 the request, then the second approval status field 350 may be changed to rejected. A rejection process 319 may update the status 310 to rejected 320 when either the second approval status field is rejected or the first approver rejects the request.

Figure 4:
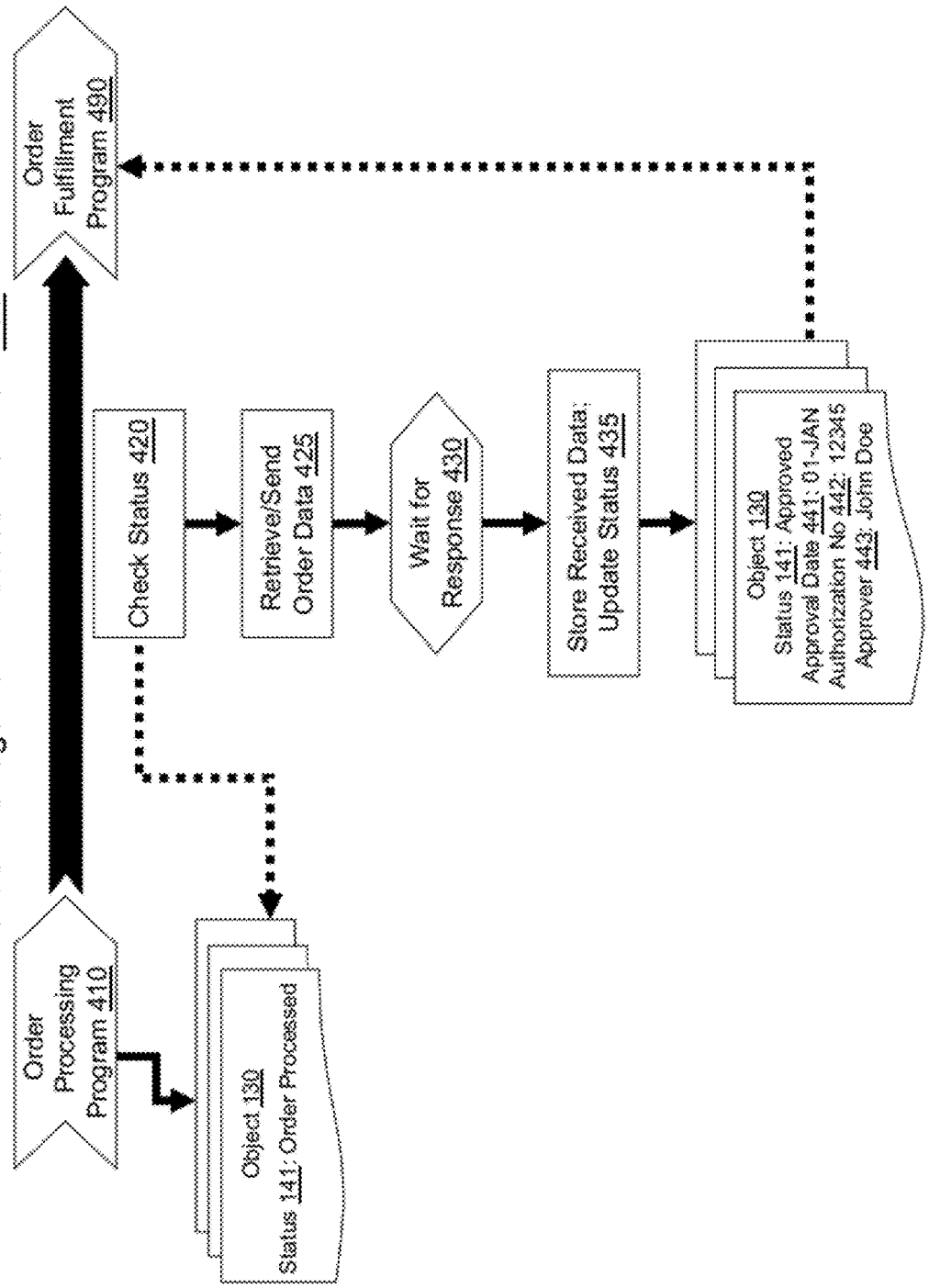
FIG. 4 shows an exemplary embodiment of the invention in a order management process workflow.

FIG. 4 shows an exemplary embodiment of the invention in an order management process workflow 400. In this embodiment, once an order processing program 410 has finished processing an electronic order for goods or services, the program 410 may send instructions to a database to update the status field 141 of the corresponding order object 130 to a partially complete status, such as order processed.

In box 420, the action management system 190 may periodically check the status field 141 of objects 130 in the database. When the action management system 190 identifies objects with status fields 141 indicating order processed, the action management system 190 may retrieve data relating to the order from the organization's computing systems, restructure the information into a third-party compatible format, and send the data to the third party for further processing 425.

For example, the action management system may extract credit card information and billing information, restructure the information into format required by a credit card processor, and send the information to the credit card processor. Alternatively, the action management system may extract order information, restructure the order information in a format required by a regulatory authority, and send the information to the regulatory authority to obtain a license, permit, or other authorization.

The system may wait 430 for a response from the entity to whom the extracted data was sent. Once a response is received, data included by the entity in the response may be stored in an organization's computing systems and the status of the object in the database may also be updated 435. For example, if a processed order was sent to a third party for approval, the third party may send back an authorization number 442, in this case 12345, and a name of a person approving the order 443, in this case John Doe. This information, along with the date 441 the approval was received may also be stored in corresponding fields of the object 130 in the database. Additionally, the status field 141 of the object 130 may also be updated to indicate that the order was approved.

Once the status field 141 of the object 130 indicates that the order has been approved, the logic in the workflow 400 may enable the order fulfillment program 490 to commence in order to begin preparing and shipping the order to the customer.

Figure 5:
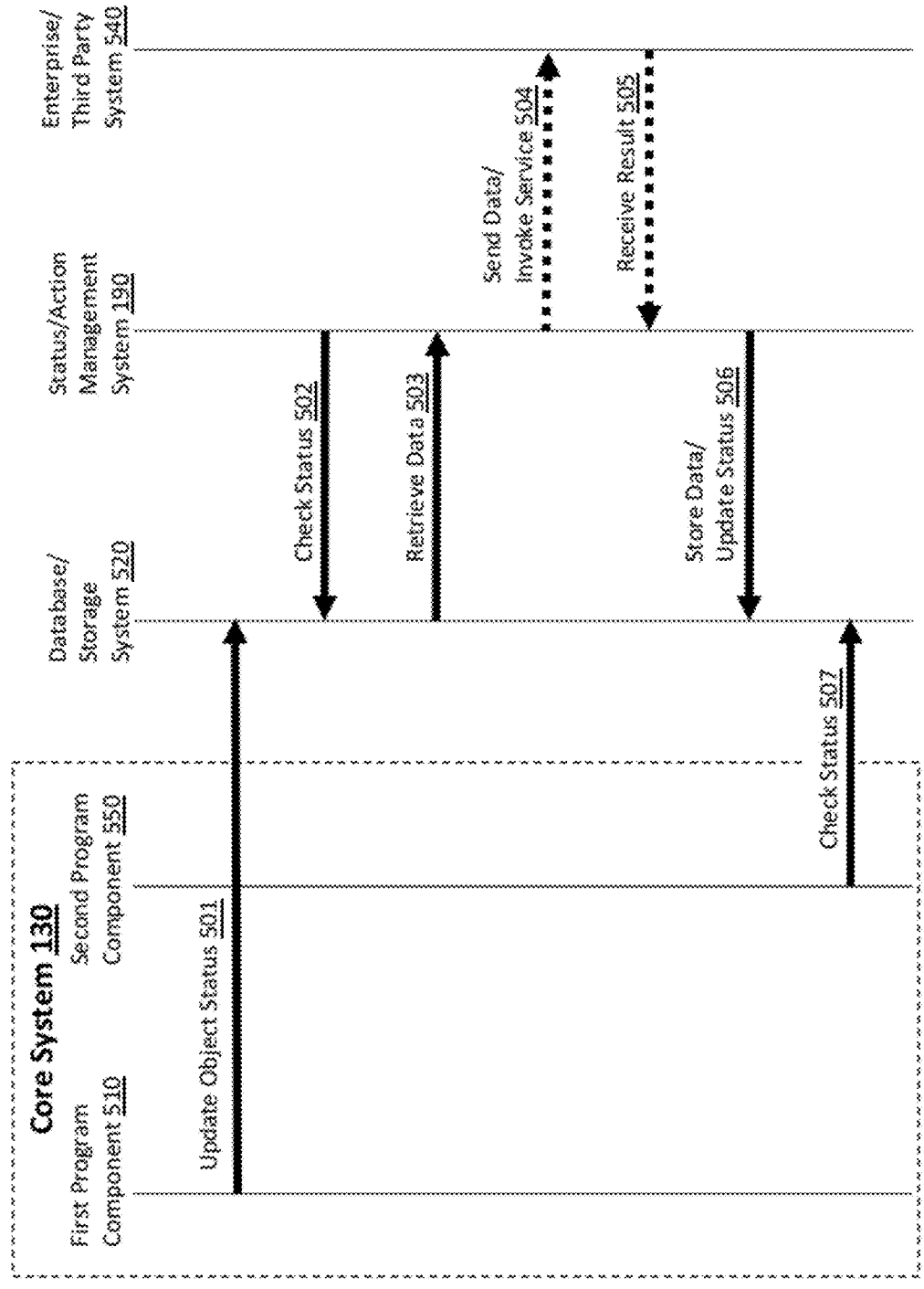
FIG. 5 shows an exemplary flow of data between systems in an embodiment.

FIG. 5 shows an exemplary flow of data between systems in an embodiment. A core system 160 may include two or more program components, including first and second components 510 and 520. Each of the program components may be independent of each other and may not directly communicate with each other.

The first program component may send an update status of an object 501 to a database system 520 when the first program component successfully processes the object. An action management system 190 may periodically check or receives status updates 502 from the database system 520. When the action management system 190 identifies objects with a status indicating that the first program component 510 has successfully completed, the action management may retrieve data 503 related to the first program component 510 from the database system 520.

In some embodiments where the action management system 190 is configured to interact with third party systems, the action management system 190 may reformat the data and send the data 504 to a third party system 540. The third party system may invoke a service to further process the data sent from the action management system 190. Once the third party system 540 has finished its processing on the data, it may send a result of the further processing to the action management system. The action management system may receive the result 505, and then send the result and a status update 506 based on the result to the database system 520 to be stored.

The action management system 190 may also perform other processing functions on objects and send updates to the database system 520 when the updates are complete.

The second program component 550 may periodically send update requests to or receive update requests from the database system 520 to determine whether the status of any objects have been updated by the action management system 190 to indicate successful completion of any processing functions on the object by the action management system 190. Once the second program component 550 identifies objects with a status indicating successful completion of processing functions, the second component 550 may begin executing its processing functions on the identified objects.

Figure 6:
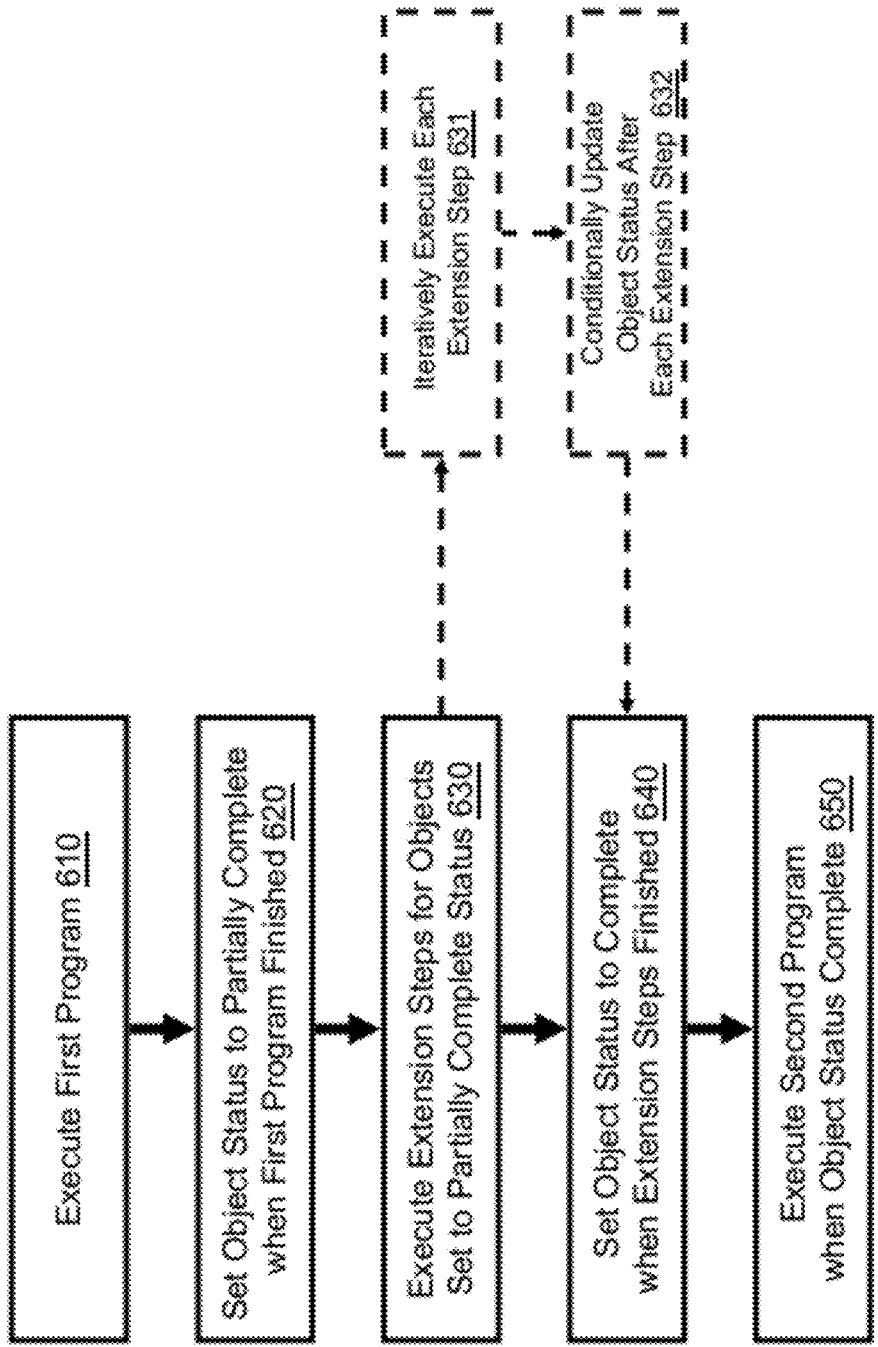
FIG. 6 shows an exemplary method in an embodiment.

FIG. 6 shows an exemplary method in an embodiment. In box 610, a first program in a core system may be executed. The first program may apply processing functions to an object in order to complete a first task in a workflow involving the object.

In box 620, a status field of the object in a database may be set to partially complete when the first program is successfully completed.

In box 630, an action management system 190 may periodically check the status fields of object in the database and perform additional, user-customized processing functions on the objects with a partially complete status set by the first program.

In some embodiments, where the additional processing functions includes multiple extension steps, in box 631 the multiple extension step functions may be iteratively executed and in box 632 the status field of the object may be conditionally updated after each extension step is executed.

In box 640, the action management system 190 may set the object status to complete when the extension sets are finished.

In box 650, a second program in the core system may check on or receive updates of the status of objects in the database. The second program may apply its processing functions on objects having a complete status set by the action management system.

Figure 7:
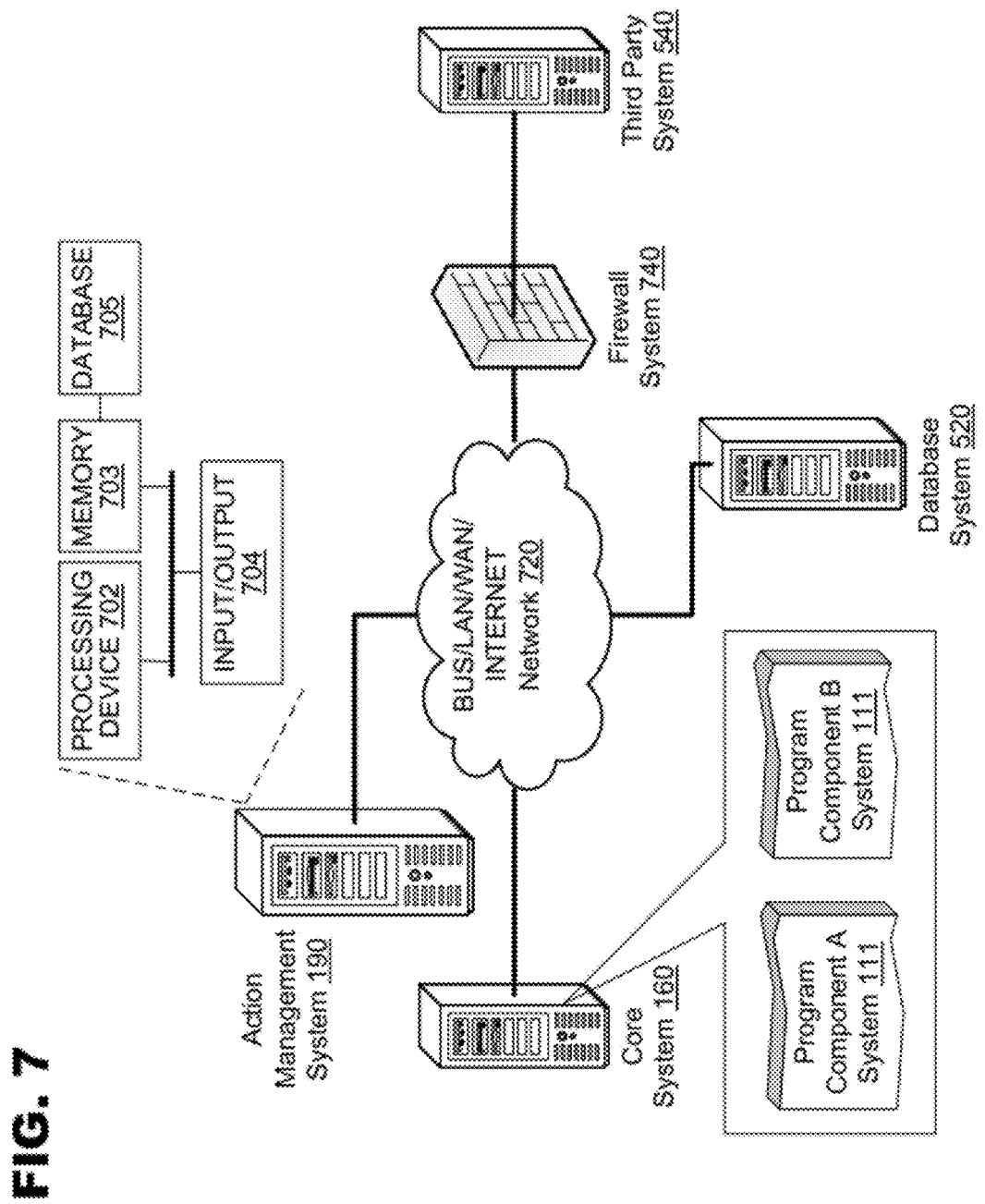
FIG. 7 shows an embodiment of systems coupled to each other through a network.

FIG. 7 shows an embodiment of an action management system 190 coupled to a core system 160, database system 520, and enterprise or third party system 540 through a network 750. In an embodiment, the core system 160 may include two or more programming components 111 (shown as program components A and B). Each of the program components may be on separate, independent computing systems forming a core system, or the components 111 may be consolidated or integrated into a single core system 160.

The third party system 540 may be connected to a firewall system 740 that may prevent the third party system 540 from directly accessing other systems of the organization, including the action management system 190, core system 160, and database system 520. If the third party system 540 is under the control of the organization or is managed by a trusted third party, then it may bypass the firewall system 740 so that it may directly access the other systems of the organization.

Each of the systems in FIG. 7 may contain a processing device 702, memory 703 containing a database 705, and an input/output interface 704, all of which may be interconnected via a system bus. In various embodiments, each of the systems 190, 160, 740, 540, 111, and 520 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 703 may contain different components for retrieving, presenting, changing, and saving data. Memory 703 may include a variety of memory devices, for example, Dynamic Random Access Memory (DRAM), Static RAM (SRAM), flash memory, cache memory, and other memory devices. Additionally, for example, memory 703 and processing device(s) 702 may be distributed across several different computers that collectively comprise a system.

Processing device 702 may perform computation and control functions of a system and comprises a suitable central processing unit (CPU). Processing device 702 may comprise a single integrated circuit, such as a microprocessing device, or may comprise any suitable number of integrated circuit devices and/or circuit boards working in cooperation to accomplish the functions of a processing device. Processing device 702 may execute computer programs, such as object-oriented computer programs, within memory 703.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, hard disks, floppy disks, or CD ROM; the Internet or other propagation medium; or other forms of RAM or ROM.

We claim:

1. A method for executing a third program between a first program and a second program of an existing computer process workflow without changing the workflow, the method comprising:
   receiving over a communications network a first update indicating a full completion of the first program in a first computing system;
   modifying, through a processing device, the received first update indicating the full completion to indicate a partial completion of the first program;
   storing the modified first update indicating the partial completion in a status field indicating a completion status of the first program, wherein the existing computer process workflow is configured to preclude the second program from executing until after the status field indicates the full completion of the first program and wherein the modification to indicate the partial completion of the first program precludes the second program from executing;
   transmitting the completion status indicating the partial completion of the first program to a second computing system, wherein the third program is executed at the second computing system to process data relating to the first program, the first and second computing systems communicatively independent of each other, the first and second programs executing independently such that they do not communicate directly with each other; and
   responsive to receiving over the communications network a second update indicating that the second computing system has completed executing the third program, updating the status field to indicate the full completion of the first program, wherein the second program is executed after the status field is updated to indicate the full completion of the first program according to the configuration of the existing computer process workflow,
   wherein the third program includes a plurality of extension steps, at least one of the extension steps includes approving an activity performed during execution of the first program.

2. The method of claim 1, the processing function further comprising:
   determining, through user-supplied processing logic, whether further approval for the activity is necessary;
   submitting an approval request for the activity to an entity according to the processing logic when approval is necessary, otherwise, updating the status field of the object to indicate no approval needed; and
   after electronically receiving an answer to the approval request from the entity, updating the status field to reflect the answer.

3. The method of claim 2, the processing function further comprising:
   if the answer indicates that the approval request has been approved, determining, through user-supplied processing logic, whether additional approval is needed;
   when additional approval is needed, iteratively submitting additional approval requests to entities in a hierarchical order after receiving approvals from subordinate entities;
   updating the status field to reflect rejection after receiving a first rejection; and otherwise updating the status field to reflect approval after receiving approvals from each entity in the hierarchy.

4. The method of claim 2, wherein the user-supplied processing logic includes use of a lookup table.

5. The method of claim 1, the processing function further comprising:
   extracting data relating to the activity;
   restructuring the data into a format compatible with a third party computing system;
   sending the extracted data to the third party computing system to obtain a result of further processing of the extracted data; and
   after receiving the result from the third party computing system, storing the result.

6. The method of claim 5, further comprising updating the status field based on the received result.

7. The method of claim 1, wherein the first and the second computing systems are connected to a same network.

8. The method of claim 1, wherein the first computing system is a core system and the second computing system is an action management system.

9. The method of claim 8, wherein the first computing system collectively includes separate computing systems for each program.

10. A computing infrastructure for executing a third program between a first program and second program of an existing computer process workflow without changing the workflow, the computing infrastructure comprising:
    a core system including at least one processor;
    instructions executable on the at least one processor adapted to cause the core system to:
       receive over a communications network a first update indicating a full completion of the first program, modify the first update indicating the full completion to indicate a partial completion of the first program and storing the partial completion in a status field indicating a completion status of the first program, wherein the existing computer process workflow is configured to preclude the second program from executing until after the status field indicates the full completion of the first program and wherein the modification to indicate the partial completion of the first program precludes the second program from executing, and transmit the completion status indicating the partial completion of the first program and updating the status field to indicate the full completion of the first program responsive to receiving a second update indicating a completion of the third program; and an action management system including at least one processor and instructions executable on the at least one processor adapted to cause the action management system to receiving the transmitted completion status indicating the partial completion of the first program, thereafter executing the third program on data relating to the first program, and transmitting the second update after completing execution of the third program, the core system and the action management system communicatively independent of each other, the first and second programs executing independently such that they do not communicate directly with each other;

wherein the execution of the third program includes extracting the data, restructuring the data into a format compatible with a third party computing system, transmitting the restructured data to the third party computing system over the communications network, obtaining a result of further processing of the extracted data from the third party computing system; and after receiving the result from the third party computing system, storing the result.

11. The computing infrastructure of claim 10, wherein at least one of the systems is connected to the communications network through a firewall system.

12. The computing infrastructure of claim 10, wherein an upgrade to one of the action management system and the core system is performed without having to modify the other system.

13. A non-transitory computer readable medium comprising a set of instructions for executing a third program between a first program and second program of an existing computer process workflow without changing the workflow that when executed by a processing device, cause the processing device to:

receive over a communications network a first update indicating a full completion of the first program;

modify the received first update indicating the full completion to indicate a partial completion of the first program;

store the modified first update indicating the partial completion in a status field indicating a completion status of the first program, wherein the existing computer process workflow is configured to preclude the second program from executing until after the status field indicates the full completion of the first program and wherein the modification to indicate the partial completion of the first program precludes the second program from executing, the first and second programs executing independently such that they do not communicate directly with each other;

transmit the completion status indicating the partial completion of the first program to a second computing system, wherein the third program is executed at the at the second computing system on data relating to the first program; and responsive to receiving over the communications network a second update indicating the second computing system has completed executing the third program, update the status field to indicate the full completion of the first program, wherein the second program is executed after the status field is updated to indicate the full completion of the first program according to the configuration of the existing computer process workflow.

14. The method of claim 1, wherein the first and second programs are executed at the first computing system.

15. The computing infrastructure of claim 10, wherein the first and second programs are executed by the same computing system.

16. The method of claim 1, wherein the data relating to the first program includes data originating from the first program.

* * * * *